(12) United States Patent
Gandorfer

(10) Patent No.: US 7,387,418 B2
(45) Date of Patent: Jun. 17, 2008

(54) ILLUMINATION SYSTEM FOR DISPLAYS, ESPECIALLY IN VEHICLES, AND COVER ASSEMBLY FOR SUCH ILLUMINATION SYSTEM

(75) Inventor: Winfried Gandorfer, Laberweinting (DE)

(73) Assignee: Lisa Dräxlmaier GmbH, Vlisbiburg (DE)

( * ) Notice: Subject to any disclaimer, the term of this patent is extended or adjusted under 35 U.S.C. 154(b) by 123 days.

(21) Appl. No.: 11/153,351

(22) Filed: Jun. 16, 2005

(65) Prior Publication Data

US 2006/0152937 A1 Jul. 13, 2006

(30) Foreign Application Priority Data

Jun. 17, 2004 (DE) .................... 10 2004 029 248

(51) Int. Cl.
G02B 6/00 (2006.01)
G09F 13/00 (2006.01)

(52) U.S. Cl. .................... 362/551; 362/488; 362/330; 362/491; 116/28.1

(58) Field of Classification Search ................ 362/555, 362/488, 511, 330, 800, 491, 601, 612, 489; 116/28.1
See application file for complete search history.

(56) References Cited

U.S. PATENT DOCUMENTS 5,532,908 A * 7/1996 Yokoyama et al. ............ 362/30

| 5,555,161 A * | 9/1996 | Roe et al. .................... 362/555 |
| 5,641,221 A | 6/1997 | Schindele et al. |
| 6,044,790 A * | 4/2000 | Murakami .................. 116/28.1 |
| 6,416,844 B1 | 7/2002 | Robson |
| 2003/0173496 A1 | 9/2003 | Glienicke et al. |
| 2004/0213008 A1* | 10/2004 | Bayersdorfer et al. ...... 362/491 |

FOREIGN PATENT DOCUMENTS

| DE | 44 21 942 A1 | 1/1996 |
| DE | 197 17 636 A1 | 11/1998 |
| DE | 102 09 622 A1 | 10/2003 |

* cited by examiner

Primary Examiner—Jacob Y Choi
(74) Attorney, Agent, or Firm—Sughrue Mion, PLLC

(57) ABSTRACT

The present invention relates to an illumination system for displays, especially in vehicles, comprising a base (3) on which at least a first light source (4) is provided to emit light, a cover (6), which is provided at a distance from the base (3) on the side of the base with the first light source (4) and has a visible side (9), at least one light guide (7), which is disposed in such a way that light emitted by the first light source (4) can be launched into the light guide and which extends through the cover (6) up to the visible side (9), whereby the light guide (7) and the cover (6) consist of two different materials and the light guide is formed integrally with the cover. The present invention also relates to a corresponding cover assembly, which is formed from the cover (6) as the cover element and the light guide (7).

11 Claims, 2 Drawing Sheets

ILLUMINATION SYSTEM FOR DISPLAYS, ESPECIALLY IN VEHICLES, AND COVER ASSEMBLY FOR SUCH ILLUMINATION SYSTEM

FIELD OF THE INVENTION

The present invention relates to an illumination system for displays, which may be used especially in motor vehicles but also in other vehicles of all types. Such illumination systems serve to backlight symbols in various colours and luminances, on one hand to render the symbol visible in the dark and/or on the other to transmit its activated function to the vehicle's driver. Examples of the use of such illuminated symbols are, for instance, switches for the rear windscreen heating of a car, displays on the gear lever, ventilation settings and the like.

The illumination of these displays may serve on one hand to enable the driver to identify the display in the dark so that he can activate it as necessary, and on the other the illumination may serve to ensure that the driver can distinguish both by daylight and in the dark whether the function, which is represented as a symbol on the display, is activated or deactivated. Preferably both illumination systems are provided.

PRIOR ART

In order to ensure such functions, i.e. a pilot illumination on one hand (typically with a luminance of several $cd/m^2$) and a functional illumination on the other (typically with a luminance of between 100 and 4,000 $cd/m^2$), it is known thus far to provide an even background illumination or pilot illumination of the symbols by using light emitting diodes. A small window is provided directly next to the symbol. This window is backed with a light guide, which establishes the connection to a bright, different-coloured light emitting diode (LED), and makes the window area, which is mostly square or round and has dimensions of approximately 2 mm to 6 mm diameter or side length, light up brightly. Both the pilot illumination and the functional illumination, i.e. illumination when the function is activated, are thus realised by light emitting diodes, i.e. point light sources. Such a system is known, for example, from DE 197 38 666 C1. With the system disclosed therein, a light guide is inserted into the pushbutton mask or operator button after forming. In this case the light guide penetrates the pushbutton mask up to a visible surface and, moreover, often projects beyond it. As a result the light guides are perceptible on the surface or on the visible side of the pushbutton mask. Furthermore, dust may collect on the projecting light guides and in the worst case the light guides could even be pressed out of the mask. Furthermore, the system disclosed in DE 197 38 666 C1 consists of many individual components, which is detrimental in respect of productivity.

DESCRIPTION OF THE INVENTION

Accordingly, the invention is based on the technical problem of solving the problems of the prior art and providing an enhanced illumination system for displays, which is improved in respect of productivity and in which a light guide terminates as precisely as possible with the visible side of the mask or cover and where there is a good connection between the light guide and the cover. Furthermore, the present invention is based on the technical problem of providing a corresponding cover assembly for such an illumination system.

This technical problem is solved by an illumination system with the characteristics of patent claim 1 and a cover assembly with the characteristics of patent claim 11. Advantageous embodiments of the present invention are identified by the remaining claims.

The invention is based on the idea of designing the light guide and the cover or mask integrally so that the light guide and the cover represent one assembly unit and the number of parts of the illumination system according to the invention is reduced. Surprisingly, with such an integral design it is possible to achieve very good adhesion between the light guide and the diffuser without at the same time causing a great deal of stray light in the cover or overspill from the light guide into the cover.

Thus the present invention proposes an illumination system for displays, especially in vehicles, comprising a base on which at least a first light source is provided for emitting light, a cover, which is provided at a distance from the base on the side of said base with the first light source and which has a visible side and at least one light guide, which is disposed in such a way that light emitted from the first light source can be launched into the light guide, and which extends up to the visible side through the cover. The visible side of the cover is understood to be the side of the cover, which is opposite the side of the cover facing towards the first light source. In other words, the visible side is the side of the cover or mask, which is visible, for example, by the driver or from the vehicle's interior. The feature whereby the light guide extends up to the visible side through the cover is understood to mean that the light guide penetrates the cover completely but does not project beyond the visible side of the cover. According to the invention, the light guide and the cover are made of different materials. Thus, although the light guide and the cover can both be transparent or translucent, they are nevertheless made of different material compositions. The light guide and the cover are created integrally so that they form one unit or one single component as will be described later in relation to the cover assembly.

In an advantageous manner, the light guide and the cover are a 2-component moulded part in which the first material is one component and the second material is the other component. In a 2-component moulded part, for example, first a milky material is injected and an aperture or apertures are left open in order to form the cover. In a subsequent step the second component is then injected into this aperture/these apertures to create the light guide(s). By creating the cover assembly (light guide and cover) as a 2-component moulded part, it is possible to solve the technical problem on which the invention is based in a simple manner by means of a cost-effective and easy process. Furthermore, it is possible to achieve a completely flush finish of a light exiting side of the light guide with the visible side of the cover without any refinishing being necessary.

Preferably a barrier layer is formed between the light guide and the cover, i.e. in the area in which surfaces of the light guide are facing towards surfaces of the cover or are in contact with the same. This barrier layer arises in particular when creating the cover assembly as a 2-component moulded part, whereby the materials of the light guide and cover fuse into a barrier layer in a very narrow marginal region so that although no stray light escapes, there is extremely good adhesion between the elements of the light guide and cover (unlike in the prior art quoted above).

According to a preferred embodiment of the present invention, the illumination system also includes at least a second light source on the base, which is likewise disposed on the side of the base on which the first light source is also provided. Furthermore, a light barrier surrounding the light guide between the cover and the base is provided to shield the light guide from light that is emitted by the second light source. Surrounding the light guide in an area between the cover and the base is understood to mean that the light barrier extends like a shaft or a cylinder from the side of the cover opposite the cover's visible side up to the side of the base which has the light sources, whereby the light guide is disposed in the shaft or the cylinder. By this means the light guide is protected against lateral stray light from the second light source. With this arrangement, the first light source preferably serves for functional illumination and the second light source for pilot illumination. For pilot illumination, a symbol provided preferably on the visible side of the cover is backlit. To protect the light guide as effectively as possible against lateral stray light, the light barriers come as close as possible to the side opposing the visible side of the mask and likewise as close as possible to the side of the base on which the light sources are provided. However, this feature is understood to mean that certain gaps can still remain between the cover and the light barrier and between the base and the light barrier, such gaps arising principally due to reasons associated with production.

Preferably, in the illumination system according to the invention, a further additional light barrier is provided. This light barrier surrounds the light guide in an area substantially between the visible side of the cover and the side of the cover opposing the visible side, i.e. in an area the thickness of the cover. According to this preferred embodiment, the light guide, the cover and the additional light barrier are formed integrally. This design is especially preferred and advisable if the cover is partially or completely translucent. This additional light barrier serves primarily to prevent an overspill of light from the light guide into the cover. In addition, it also serves to prevent an overspill of light (from the second light source) from the cover into the light guide. Furthermore, due to the integral design there is no need for any additional component which might have a negative effect on assembly.

Preferably, in this development, the additional light barrier, the cover and the light guide are constructed of different materials and are an integral 3-component moulded part, whereby the materials of the cover, the light guide and the light barrier represent the three components. The light barrier is formed of opaque material for functional reasons. The advantages arising as a result thereof correspond to those which were mentioned previously in relation to the 2-component moulded part.

A first barrier layer is formed between the light guide and the additional light barrier and a second barrier layer is formed between the light barrier and the cover to achieve good adhesion between the three elements of the individual component. This arises especially in the design as integral 3-component moulded part, because the materials of the light guide and the light barrier fuse in a narrow area forming the first barrier layer and likewise the materials of the light barrier and the cover fuse to form the second barrier layer.

In order to lessen the overspill of light from the light guide into the cover, which is partially or completely translucent, the thickness of the cover is reduced in the area where it is penetrated by the light guide in addition to or alternatively to the additional light barrier referred to above. In other words, in the area where the light guide penetrates, a kind of halo is formed in which the thickness of the cover is less than in the remaining area. The larger the area between the light guide and the cover or the adjoining areas, the greater the overspill from the light guide into the cover. For this reason it is preferable to minimise the thickness in the area of the light guide.

According to a preferred embodiment of the present invention, the first and/or second light source is a light emitting diode.

As already mentioned previously, preferably an opaque layer with the symbols cut out is applied to the visible side of the cover, whereby the cover is partially and preferably completely translucent. This can be achieved, for example, by applying an opaque varnish to the translucent cover and then subsequently cutting out the symbols by means of laser.

Furthermore, in addition to the illumination system, the present invention proposes a cover assembly for such an illumination system comprising a cover element with a visible side that corresponds substantially to the cover described above; and at least one light guide, which extends through the cover up to the visible side, whereby the light guide and the cover element consist of two different materials and the light guide is formed integrally with the cover element.

Further advantageous development features of the cover assembly correspond to the advantageous embodiments of the illumination system, so that reference is only made to the preferred embodiments described above in order to avoid repetitions.

BRIEF DESCRIPTION OF THE DRAWINGS

The invention is described more precisely in the following on the basis of the accompanying drawings, purely by way of example, in order to improve understanding of the present invention and to identify further advantages and features of said invention.

The drawings show.

DESCRIPTION OF EXEMPLARY EMBODIMENTS

The present invention is described more precisely in the following purely by example on the basis of preferred embodiments.

Figure 1:
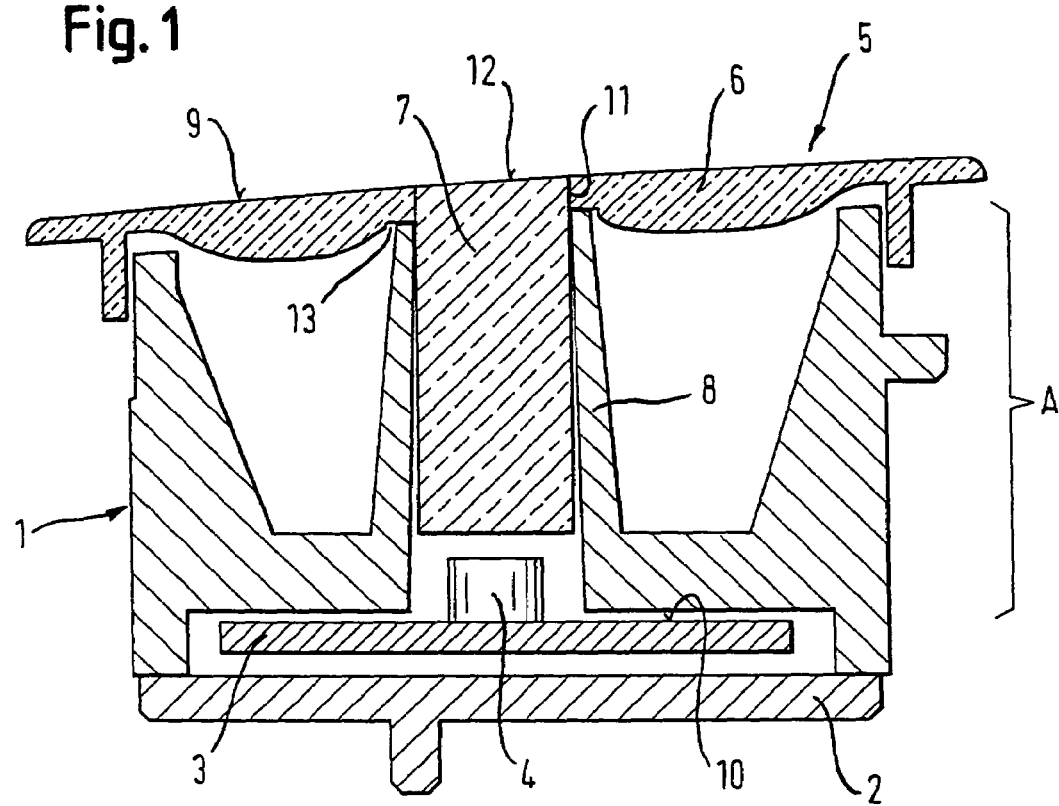
FIG. 1 a schematic cross-section of a first exemplary embodiment of the present invention.

FIG. 1 shows an illumination system for displays, especially in vehicles, according to the present invention in a first exemplary embodiment. The illumination system shown in FIG. 1 comprises a housing, which is formed from a first housing section 1 and a second housing section or a housing bottom 2. In addition, a base 3 is provided, which is preferably a printed circuit board. A first light source 4 in the form of a light emitting diode (LED) is provided on the base. Furthermore, the illumination system shown comprises a cover assembly 5, which is made up of cover 6 or cover element 6 and light guide 7. In addition, a light barrier 8 is moulded onto first housing section 1. However, it is also conceivable that the light barrier represents a separate element.

As shown in FIG. 1, first light source 4 is disposed on side 10 of base 3, said side facing towards the side of cover 6, which is facing away from visible side 9 of cover 6. In addition, the cover of base 3 is provided on side 10 of base 3 with a gap to first light source 4. Light source 4 is disposed underneath light guide 7 so that a light emitted on an electrical signal by light source 4 can be launched into light guide 7. Light barrier 8 surrounds light guide 7 in an area between cover 6 and base 3, which is identified by the reference letter A. At the same time it is also apparent that preferably light barrier 8 reaches close up to the side opposite visible side 9 of cover 6 to prevent an overspill through light guide 7 into adjacent areas and if possible, as will be described later, to prevent stray light from a second light source reaching the light guide.

As is additionally apparent from FIG. 1, light guide 7 and cover 6 (or the cover element) form an integral component 5 (cover assembly). This assembly is preferably produced by means of a 2-component injection moulded part. In this case light guide 7 is formed from a first material, which represents one component, and the cover from a second material, which represents the other component. At the same time, the first or the second component is injected first of all and subsequently the other component is injected in a further process step. For example, first of all the material of the cover is injected into a mould and an aperture is left open for the light guide. Subsequently, the material of the light guide amongst other things is injected into the aperture as a result of which the material of the cover and the material of the light guide fuse together in a narrow area. Consequently it is possible in an accurate and easy way to ensure that light emission side 12 of light guide 7 terminates flush with visible side 9 of cover 6 so that light guide 7 does not project beyond visible side 9 of cover 6 and is thus not haptically perceptible on the visible side. In addition, the materials of light guide 7 and cover 6 fuse during the 2-component injection moulding process and form a barrier layer 11. Thus in a very narrow area (less than 2 mm gap from the light guide) no visible stray light is generated but nevertheless there is very good adhesion between light guide 7 and cover 6 compared with the prior art referred to above. A 2- (or more) component injection moulding process is inherently known so that no further explanations are required in this respect.

Moreover, by this development according to the invention it is possible to reduce the number of components during assembly and thus improve productivity of the illumination system. Furthermore, a cover assembly 5 may be achieved for the illumination element in which the light guide does not project beyond visible side 9 of cover 6 so that no dust deposits are able to collect there. Moreover, the cover is improved in respect of haptics since the light guides are not perceptible on the visible side. By comparison with the prior art, a good union is also achieved between light guide 7 and cover 6 due to the integral design.

Furthermore, as is apparent in FIG. 1, the cover is reduced in thickness in the area where it is penetrated by light guide 7. In other words, in the area of the aperture created by light guide 7 in cover 6, a depression 13 surrounding the light guide is provided, said depression forming a sort of halo around the light guide. Boundary area 11 between light guide 7 and cover 6 is reduced in cross-section by this depression so that the overspill from light guide 7 into cover 6 or the mask, which is partially translucent or fully translucent, is reduced.

Figure 2:
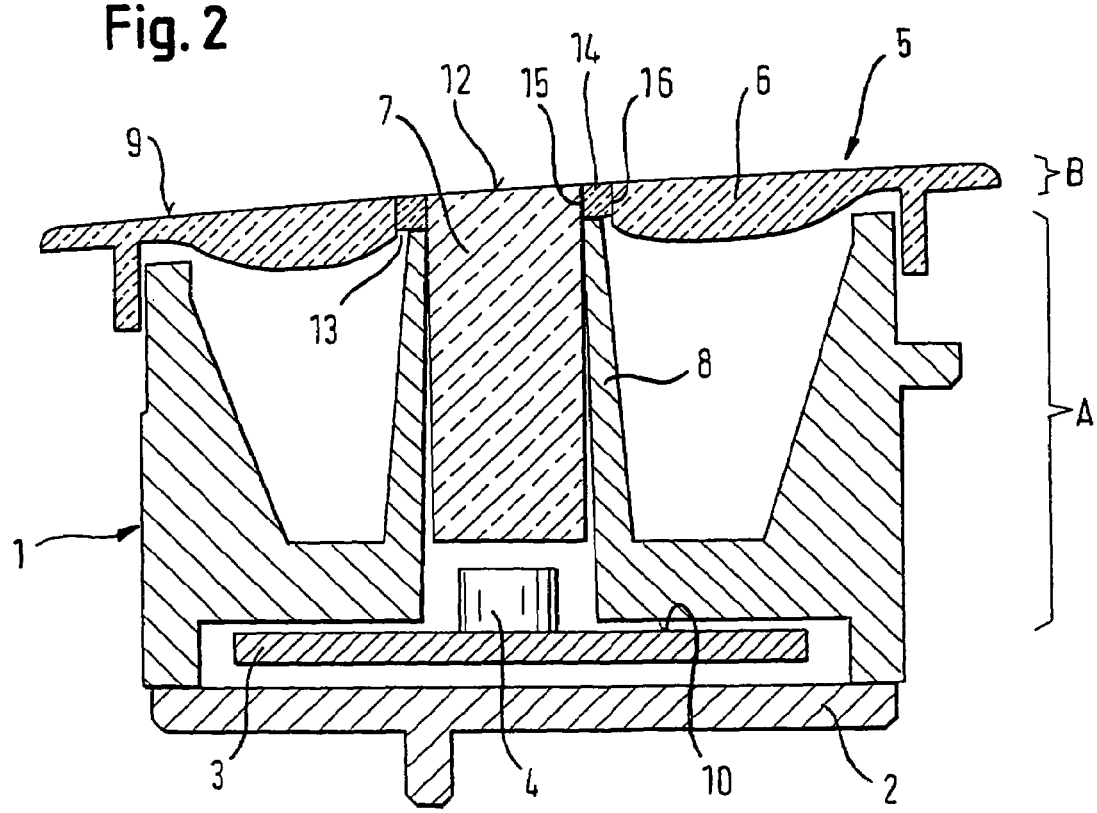
FIG. 2 a schematic cross-section of a second embodiment of the present invention.

FIG. 2 shows a second embodiment of the present invention in a similar cross-section to FIG. 1. The second embodiment of the present invention corresponds substantially to embodiment 1, which is shown in FIG. 1. Thus the same reference numerals indicate the same or similar parts in the different Figures and views.

The substantial difference between embodiment 2 in FIG. 2 is that a further additional light barrier 14 is formed between cover 6 and light guide 7. In the embodiment shown, cover assembly 5 is formed by light guide 7, cover element 6 or cover 6 and additional light barrier 14 and represents an integral individual component. In this second embodiment, cover assembly 5 is preferably produced in a 3-component moulding process, whereby cover 6, light guide 7 and additional light barrier 14 are each formed from different materials and represent the three components of the moulding process. Thus, for example, first of all the material of cover 6, which for example is milky translucent, is injected whereby an aperture is provided. Subsequently, the material of additional light barrier 14, which is opaque, is injected into the aperture whereby once again an aperture is left free. Finally, the material of light guide 7 is injected into the remaining aperture. As a result of this process, a first barrier layer 16 and a second barrier layer 15 form respectively between cover 6 and light barrier 14 and light barrier 14 and light guide 7. By the provision of additional light barrier 14, which surrounds light guide 7 in an area B or the thickness of cover 6, it is possible to effectively prevent an overspill from light guide 7 onto translucent cover 6 or the mask and vice versa.

The remaining development of the second embodiment corresponds to the embodiment in FIG. 1 with the result that a repetitive description is dispensed with.

Figure 3:
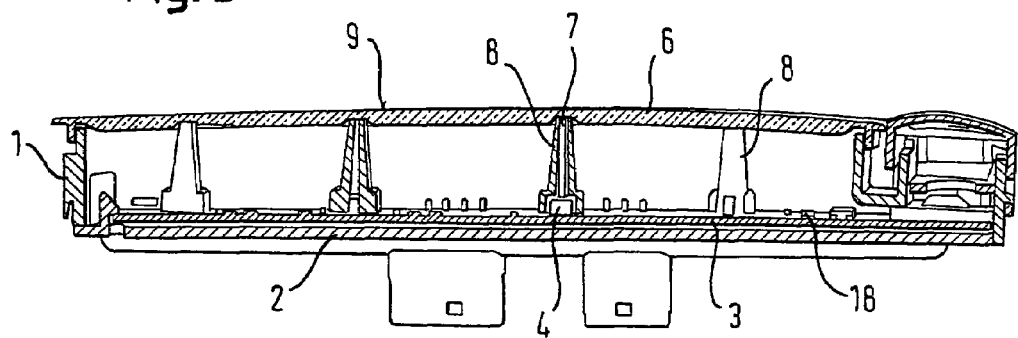
FIG. 3 a cross-section of a preferred third embodiment of the present invention.
Figure 4:
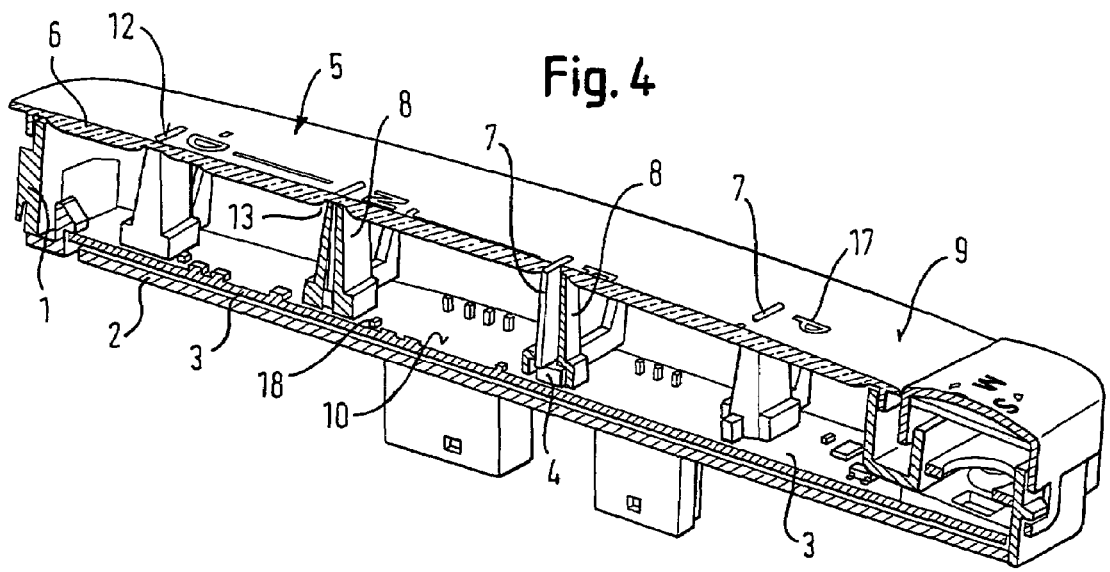
FIG. 4 a perspective view of the third embodiment shown in cross-section in FIG. 3.
Figure 5:
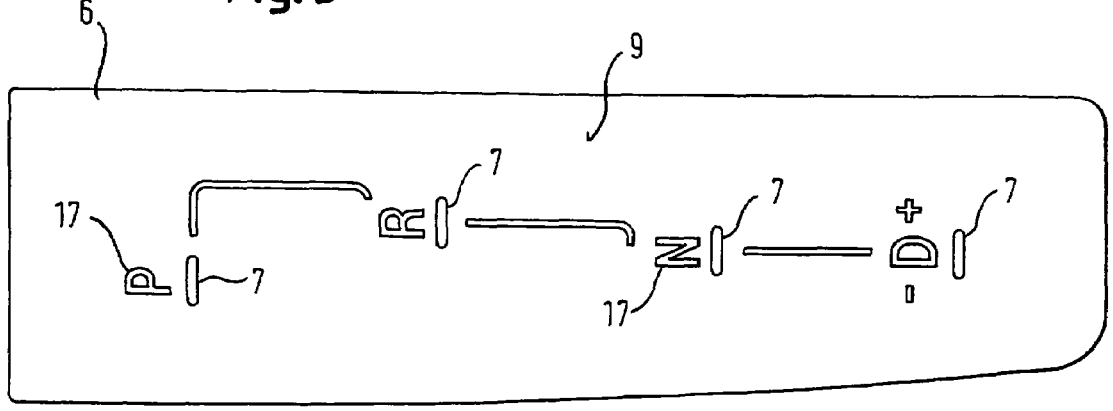
FIG. 5 an example of the symbols provided on the cover or cover element, which are used in the preferred third embodiment of the present invention that is shown in FIGS. 3 and 4.

A preferred third embodiment of the present invention, which implements the schematic first embodiment of the present invention in FIG. 1, will now be described with reference to FIGS. 3 to 5. In FIGS. 3 to 5, the same reference numerals also indicate the same or similar parts to those in FIGS. 1 and 2 with the result that it is possible to dispense with a detailed description of these elements.

FIG. 3 shows a cross-section of an illumination system in accordance with the third embodiment of the present invention. Four light guides 7 and correspondingly four associated light barriers 8 are provided in the illumination element. Accordingly, four apertures for light guides 7 are provided in the mask or cover 6.

Furthermore, in addition to first light source 4, which is disposed on side 10 of base 3, two further light sources 18 are provided, which are likewise created as LEDs. In addition, symbols 17 are provided on visible side 9 of cover 6. For this purpose, cover 6 is formed of a translucent transparent or translucent material. Subsequently, the symbols are applied, for example, by varnishing visible side 9 with an opaque layer and leaving open symbols 17 by means of a template or by complete application of an opaque layer and subsequent lasering of symbols 17.

Light source 18 serves in the present exemplary embodiment for pilot illumination and backlights symbols 17 so that they are also visible in the dark.

By contrast, light guides 7 serve for functional illumination to illustrate which function is activated at the appropriate time. For this purpose, light guides 7 penetrate cover 6 up to visible side 9 and are also not covered by the additional opaque layer. This is also made clear again in FIG. 5, which shows a top view of visible side 9 of a gear display for an automatic transmission. Light barriers 8 are provided to prevent stray light from light source 18 onto light guides 7. The same applies for overspill from the light guides onto symbols 17.

To avoid strong overspill from light guide 7 into translucent cover 6, the thickness of cover 6 is reduced in the area of the aperture by light guide 7 (depression 13) so that the boundary surfaces between light guide 7 and cover 6 in which overspill can occur are reduced.

In addition, cover assembly 5 forms an integral component with cover 6 or cover element 6 and light guide 7 so that the illumination system with its essential constituents consists of only four components, whereby preferably light barriers 8 are also formed integrally with a housing section. On one hand this integral assembly, which is preferably produced in a 2-component moulding process, makes it possible to achieve flush termination of light emission side 12 of light guide 7 with visible side 9 of cover 6 so that dust deposits are prevented and the surface is haptically excellent, i.e. that light guides 7 cannot be felt on the visible side. Moreover, this also makes it impossible to press light guides 7 out of cover 6 since an outstanding adhesive bond is achieved between the light guide and cover 6. Furthermore, the assembly's productivity is improved due to the reduced number of parts.

To further reduce the overspill from light guide 7 into translucent cover 6, a further additional light barrier 14 may also be provided in the third exemplary embodiment similarly to FIG. 2 in the area of the thickness of cover 6.

Although the present invention has been described purely by way of example on the basis of preferred embodiments, it should be noted that various modifications and alterations are possible without straying from the scope of the present invention as it is defined by the accompanying patent claims.

The invention claimed is:

1. Illumination system for displays in vehicles, comprising
   a base (3) on which at least a first light source (4) is provided to emit light,
   a cover (6), which is provided at a distance from the base (3) on the side of the base with the first light source (4) and has a visible side (9),
   at least one light guide (7), which is disposed in such a way that light emitted by the first light source (4) is launched into the light guide and which extends through the cover (6) up to the visible side (9),
   wherein the light guide (7) and the cover (6) include two different transparent or translucent materials and the light guide is formed integrally with the cover, whereby a barrier
   layer (11) is formed in the area between the light guide (7) and the cover (6) to minimize stray light; and
   wherein the illumination system further comprises at least a second light source (18) on the base (3) on the side of the first light source (4) and, for shielding the light guide (7), a light barrier (8) surrounding the light guide between the cover and the base, whereby the first light source (4) serves for functional illumination and the second light source (18) serves as pilot illumination for backlighting of symbols (17) on the visible side of the cover.

2. Illumination system according to claim 1, in which an additional light barrier (14) surrounding the light guide in the area of the thickness of the cover is formed integrally with the light guide (7) and the cover (6).

3. Illumination system according to claim 2 in which the additional light barrier (14), the cover (6) and the light guide (7) are constructed of different materials and are an integral 3-component molded part.

4. Illumination system according to claim 2 in which a first barrier layer (15) is formed between the light guide (7) and the additional light barrier (14) and a second barrier layer (16) is formed between the light barrier (14) and the cover (6).

5. Illumination system according to claim 2 in which the thickness of the cover (6) is reduced in the area where it is penetrated by the light guide (7).

6. Illumination system according claim 2 in which the first (4) and/or second (18) light source is a light emitting diode.

7. Illumination system according to claim 2 in which the cover (6) is at least partially, preferably completely, translucent and where an opaque layer with recessed symbols (17) is applied on the visible side (9) of the cover.

8. Cover assembly (5) for an illumination system for displays in vehicles, comprising: a cover element (6) with a visible side (9); at least one light guide (7) which extends up to the visible side (9) through the cover element (6); and a first light source provided to emit light through the light guide, wherein the light guide (7) and the cover element (6) include two different transparent or translucent materials and the light guide is formed integrally with the cover element whereby a barrier layer (11) is formed in the area between the light guide (7) and the cover element (6) to minimize stray light; wherein the cover element further comprises a light barrier (14) surrounding the light guide (7) in the area of the thickness of the cover element (6); and wherein a first barrier layer (15) is formed in the area between the light guide (7) and the light barrier (14) and a second barrier layer (16) is formed between the light barrier (14) and the cover element (6).

9. Cover element according to claim 8 in which the light barrier (14), the cover element (6) and the light guide (7) are constructed of different materials and are an integral 3-component molded part.

10. Cover assembly according to claim 8 in which the thickness of the cover element (6) is reduced in the area where it is penetrated by the light guide (7).

11. Cover assembly according to claim 8 in which the cover element (6) is at least partially, preferably completely, translucent and where an opaque layer with recessed symbols (17) is applied on the visible side (9) of the cover element.

* * * * *